(No Model.)

W. SMITH.
GATE.

No. 428,536. Patented May 20, 1890.

Witnesses:
E. P. Ellis,
B. Brooken,

Inventor:
Wesley Smith,
per
J. A. Lehmann,
Atty.

UNITED STATES PATENT OFFICE.

WESLEY SMITH, OF PIERCE, OHIO.

GATE.

SPECIFICATION forming part of Letters Patent No. 428,536, dated May 20, 1890.

Application filed March 3, 1890. Serial No. 342,386. (No model.)

*To all whom it may concern:*

Be it known that I, WESLEY SMITH, of Pierce, in the county of Stark and State of Ohio, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the combination of the gate, having shouldered blocks secured to opposite sides near its outer and upper corner, with pivoted braces, which, by catching under the shouldered blocks, hold the outer end of the gate raised at any suitable angle, and blocks secured to the gate below the ends of the braces, which serve to prevent the outer end of the gate from being raised, as will be more fully described hereinafter.

The object of my invention is to have the same braces hold the gate in a raised position at its outer end, or lock the outer end so that it cannot be raised.

Figure 1:
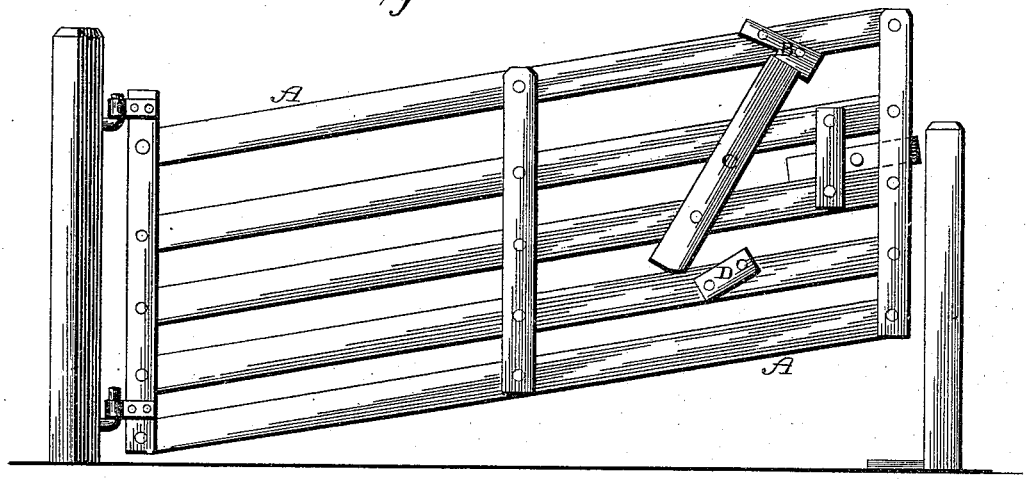
Figure 2:
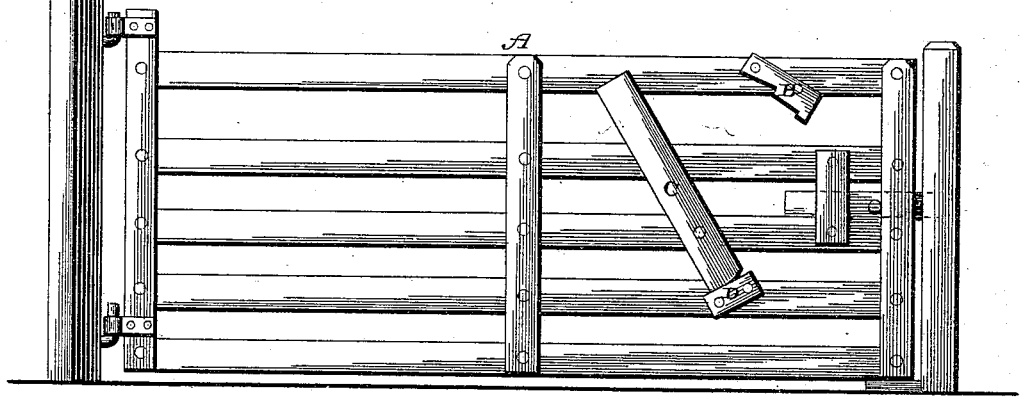

Figure 1 is a side elevation of a gate embodying my invention, and showing the outer free end of the gate raised. Fig. 2 is a similar view showing the outer end of the gate locked so that it cannot be raised.

A represents an ordinary gate, the parts of which are pivoted together in the usual manner, so that its outer end can be raised and lowered to any desired degree. Secured to opposite sides of this gate, near its outer upper corner, are the shouldered blocks B, against which the upper end of the pivoted braces C catch for the purpose of holding the outer end of the gate in a slightly-raised position, either to allow small animals to pass back and forth under the gate or to take up the sag that may take place. There may be any desired number of shoulders upon the blocks which are rigidly secured in position upon the gate, and hence the outer end of the gate can be raised to any desired degree either for the purpose of swinging over snow-drifts or for the purpose of allowing the smaller animals to pass under from one field to another, while large animals are prevented from passing through. The braces C are secured rigidly together and are pivoted to opposite sides of the gate, and can be made to incline either toward the outer upper corner of the gate or toward the inner corner, as may be desired.

Secured to opposite sides of the gate are the two blocks D, which are placed at or about a right angle to the blocks B, and which serve as supports or bearings for the lower ends of the braces when their upper ends are turned backward into the position shown in Fig. 2. When the braces are turned into the position shown in Fig. 2, the outer end of the gate is locked, so that it cannot be raised, for the blocks D then strike against the braces and prevent all upward movement. These blocks D and braces C prevent animals from raising the gate, so as to unlatch it, as when the ordinary latch is used. The braces C have their lower ends slightly cut away at one corner, as shown, so that they can be turned upon their pivot to disengage the blocks D, so as to allow the gate to be raised into the position shown in Fig. 1.

Having thus described my invention, I claim—

The combination, with the gate, of the shouldered block secured thereto near its upper outer corner and extending at an angle thereto, and a block secured to the gate near its outer lower corner and extending at a different angle from the shouldered blocks, and a brace pivoted between the blocks, whereby the upper and lower ends thereof can be made to alternately engage the upper and lower blocks, respectively, substantially as shown.

In testimony whereof I affix my signature in presence of two witnesses.

WESLEY SMITH.

Witnesses:
S. S. STANDS,
WM. BARFUSS.